No. 875,556.  
J. L. SCHUREMAN.  
VEHICLE FENDER.  
APPLICATION FILED FEB. 21, 1907.
PATENTED DEC. 31, 1907.
2 SHEETS—SHEET 1.
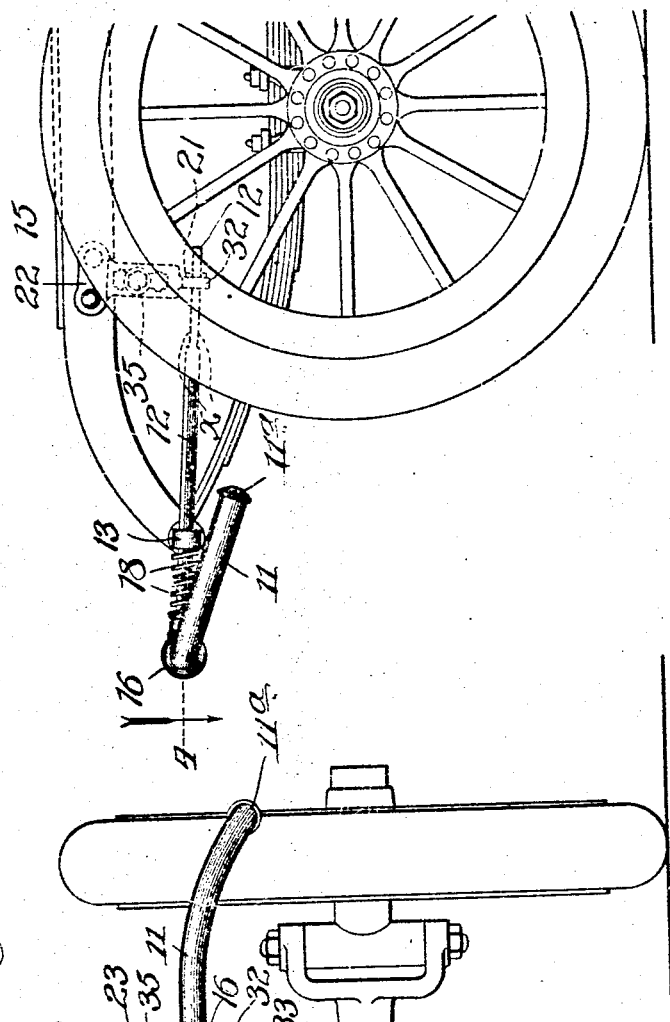
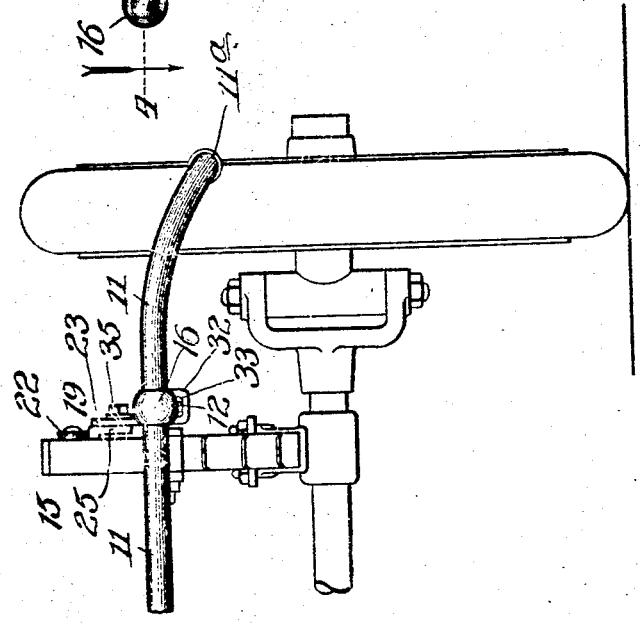
Witnesses:  
Chas E Gaylord.  
John Enders.
Inventor:  
Jacob L. Schureman,  
By Dyrenforth, Dyrenforth, Lee & Wiles,  
Attys.

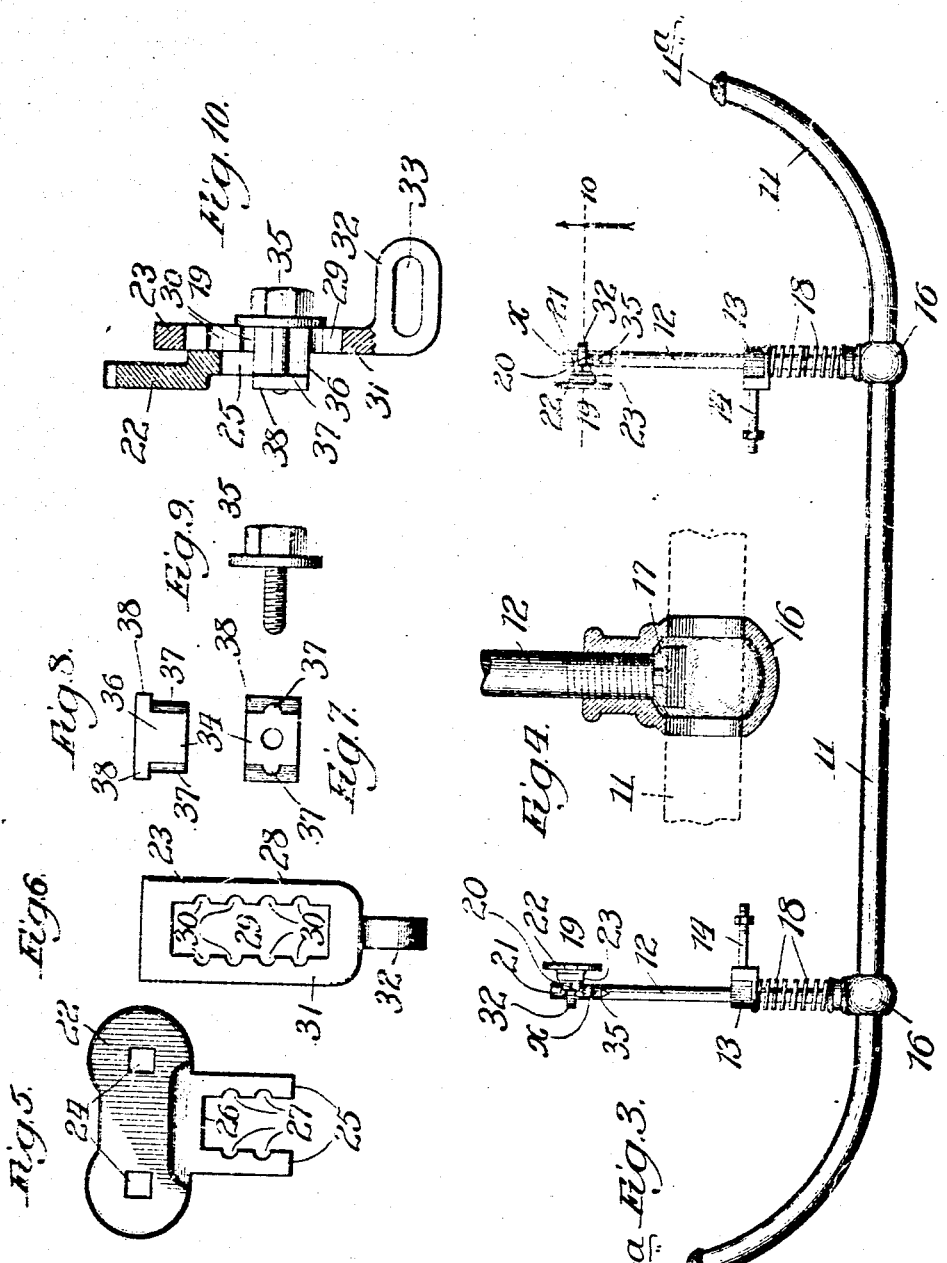

UNITED STATES PATENT OFFICE.

JACOB L. SCHUREMAN, OF CHICAGO, ILLINOIS, ASSIGNOR TO APPLIANCE MANUFACTURING COMPANY, OF CHICAGO, ILLINOIS, A CORPORATION OF ILLINOIS.

VEHICLE-FENDER.

No. 875,556.    Specification of Letters Patent.    Patented Dec. 31, 1907.

Application filed February 21, 1907. Serial No. 358,616.

*To all whom it may concern:*

Be it known that I, JACOB L. SCHUREMAN, a citizen of the United States, residing at Chicago, in the county of Cook and State of Illinois, have invented a new and useful Improvement in Vehicle-Fenders, of which the following is a specification.

My invention relates more especially to an improvement in fenders for use on automobiles to protect their front ends and the attachments carried thereon, such as the lamps, against injury from collisions.

My primary object is to provide improvements in the construction of fenders of this variety whereby great security from injury to the automobile and the attachments referred to, as well as to the fender itself, may be insured.

Referring to accompanying drawings—Figure 1 shows by a view in side elevation the front end of an automobile equipped with my improved fender; Fig. 2 is a view in front elevation of the portion of the automobile and fender shown in Fig. 1; Fig. 3, a plan view of the fender shown in Fig. 1; Fig. 4, a broken enlarged sectional view of a detail, taken at the line 4 on Fig. 1 and viewed in the direction of the arrow; Fig. 5, an enlarged face view of one of the rigid members of one of two similar brackets for guidingly supporting the fender at its rear ends; Fig. 6, a similar view of the adjustable member of said bracket; Fig. 7, an end view of the nut for clamping the bracket-members together; Fig. 8, a side view of the nut shown in Fig. 7; Fig. 9, a side view of the clamping-bolt employed with the nut, and Fig. 10, a section taken at the line 10 on Fig. 3, and viewed in the direction of the arrow, and enlarged.

The impact-bar 11 of my improved fender which I preferably form of steel tubing, has its ends deflected backwardly and downwardly as represented in Figs. 1 and 2, this bar being of a length adapting it to extend across an automobile-front with its ends in alinement with the tires, when positioned on an automobile, as hereinafter explained, the open ends of this bar being covered with protecting caps 11ª which have smooth curved outer surfaces, as shown, to protect the tires, in case of collision, from injury. This bar is adjustably secured at points between its ends to the outer extremities of supporting-rods 12, 12 which pass, guidedly through supporting-heads 13, 13 adapted to be secured, as by bolts or studs 14, 14 extending laterally and inwardly from the heads, to the front of an automobile frame, such as that shown at 15, at its opposite sides. Each rod 12 screws into a hollow head 16 which loosely surrounds the bar 11, and has pivotally mounted on its outer end, to enter the interior of the head, a concave clamping-plate 17, the plates 17, when the rods 12 are screwed tightly into the heads, engaging with the latter and rigidly clamping the bar near its opposite ends to the rods in the desired position of the latter longitudinally of the bar. Surrounding the outer end of each rod 12 and confined between its head 16 and the respective guiding-head 13, are a plurality of end-abutting coiled spring-sections 18, forming a cushioning-medium for the impact-bar near its opposite ends, for the purpose hereinafter described.

The rods 12 are guidedly confined at their rear end-portions, which are flattened as represented at $x$, in adjustable brackets 19 adapted to be bolted to the opposite sides of an automobile, in the rear of the heads 13, the flattened end-portions of the rods 12 containing drive-pin or cotter-pin openings 20, into any one of which a pin 21 may be driven to prevent the rods from being accidentally withdrawn, as by jarring, from the brackets 19. Each bracket 19 comprises an attaching-plate 22, an adjustable plate 23 and clamping means for holding the plates rigidly together in adjusted position. Each plate 22 is provided with bolt-holes 24, near its upper end, at which it is adapted to be secured to an automobile at one side, and with a bifurcated offset lower-portion or yoke 25 affording, between its arms, a nut-receiving socket 26 with its side-walls containing a series of transverse notches 27, preferably semi-circular in cross-section, and spaced equidistant from each other. The plate 23, which fits against and is adjustable on the outer surface of the plate 22, is formed with a shank-portion 28 having a central longitudinal nut-receiving opening 29 provided in its side-walls with a series of transverse notches 30, like the notches 27, and adapted to register with them; and extending downward from this shank-portion is a stem 31 terminating in a lateral extension 32, forming a loop, and disposed at a right-angle to the shank-portion with an elongated slot 33 in it, through which a rod 12 passes for guidance.

The clamping means, referred to, for each bracket consists of a nut 34 and a bolt 35 cooperating therewith. The nut 34, which is approximately square in cross-section, has on two opposite sides of its body-portion 36, longitudinal tongues 37, and at one end it is expanded into a flange 38 which extends laterally beyond said tongues for engaging the inner surface of the plate 22 when the nut is in clamping position therein, as hereinafter explained. The plates 22 and 23 are secured together in the desired relative adjusted position by inserting the nut 34 at its body-portion into the recess 26 and opening 29, the tongues on the nut entering registering notches 27 and 30, and thereupon screwing the bolt 35 into the nut to clamp the plates between the flange 38 and the head on the bolt, the engagement of the tongues with the notches serving to hold the plates rigidly together.

The preferred position of the impact-bar on an automobile is that represented in Figs. 1 and 2, in which the rods 12 incline downwardly toward their rear ends. By providing the adjustable connections between the rods 12 and impact-bar and the adjustable guide-brackets, my improved fender may be readily and accurately applied to different sizes and types of automobiles; and providing the springs 18 in a plurality of short sections, they may be readily shortened, by removing sections, to permit the fender to be applied in proper position so far as extent of protrusion beyond the front of any automobile is concerned. With the impact-bar thus spring-cushioned on an automobile-front, the force of the impact against it, when struck, will be absorbed to a great degree by the springs, thus protecting the automobile against injury from severe jarring. With the elongated guides for the rear ends of the rods 12, afforded by the laterally projecting loops, in the event of a blow being exerted against one end of the bar, it will cause the bar to yield at that end only, and the free end of the rod to move horizontally in the guide-opening and thus avoid torsional strain on the fender-parts with consequent injury of them.

As is readily apparent the plates 23 may be clamped to the plates 22 in a position to cause their loop-extensions to extend inwardly instead of outwardly, as shown, by reversing the plates 23, when it is necessary for any purpose to do so to effect the proper adjustment of the fender on the vehicle.

The flattened ends of the supporting-rods after the fender has been adjusted to a vehicle, by reason of their engagement with the elongated slots in the loop-extensions, prevent accidental turning of the rods in the heads 15, and thereby prevent accidental loosening of the impact-bar on its supporting-rods.

What I claim as new, and desire to secure by Letters Patent, is:—

1. A vehicle-fender comprising, in combination, an impact-bar, supporting-rods connected with said bar, guiding-supports adapted to be secured to the sides of a vehicle and in which said rods are guidedly supported between their ends, cushioning means for the bar interposed between it and said guiding-supports, and guide-brackets adapted to be secured on opposite sides of a vehicle and having elongated guide-slots in which the rear ends of said rods are removably confined.

2. A vehicle-fender comprising, in combination, an impact-bar, supporting-rods connected with said bar, guiding-supports adapted to be secured on opposite sides of a vehicle and in which said rods are guidedly supported between their ends, cushioning-means for the bar, and guide-brackets, each comprising a member adapted to be secured to a side of a vehicle and a second member adjustably secured on said first-named member and provided with an elongated guide-slot for the rear end-portion of the supporting-rod.

3. A vehicle-fender comprising, in combination, an impact-bar, supporting-rods connected with said bar, guiding-supports adapted to be secured on opposite sides of a vehicle and in which said rods are guidedly supported between their ends, cushioning-means for the bar, and guide-brackets, each comprising a plate adapted to be secured to a side of a vehicle and having a nut-receiving socket, a second plate adjustable on said first-named plate and provided with a nut-receiving opening, and a stem containing a laterally extending guide-slot for receiving the rear end-portion of a supporting-rod, and a clamping-nut and bolt adjustably confined in said socket and opening, for the purpose set forth.

4. A vehicle-fender comprising, in combination, an impact-bar, supporting-rods connected with said bar, guiding-supports adapted to be secured on opposite sides of a vehicle and in which said rods are guidedly supported between their ends, cushioning-means for said bar interposed between it and said guiding-supports, and guide-brackets, each comprising a plate adapted to be secured to a side of a vehicle and having a nut-receiving socket with a series of notches in its walls, a second plate adjustable on said first-named plate and provided with a nut-receiving opening having a series of notches in its walls registering with the notches in said socket and with a guide-slot for receiving the rear end-portion of a supporting-rod, and clamping-means consisting of a flanged nut entering said socket and opening and provided on opposite sides with tongues fitting in said notches, and a clamping-bolt coöperating with said nut to clamp the plates together in adjusted position.

5. A vehicle-fender comprising, in combination, an impact-bar having its ends deflected downwardly and rearwardly, supporting-rods having flattened and perforated rear ends and on the forward ends of which said bar is supported and longitudinally adjustable, guiding-heads through which said rods extend provided with bolt-extensions at which the heads are adapted to be secured to an automobile at its opposite sides, coiled springs confined on said rods between the bar and said heads, guide-brackets adapted to be secured to the sides of a vehicle and provided with laterally extending guide-slots through which the flattened rear ends of said rods extend to be guidedly supported therein, and stop-pins in said perforation, for the purpose set forth.

6. A vehicle-fender comprising, in combination, an impact-bar formed of tubing, tire-protectors confined on the ends of said bar and supporting-rods for said bar adapted to be supported on the opposite sides of the vehicle.

JACOB L. SCHUREMAN.

In presence of—
R. A. SCHAEFER,
J. H. LANDES.